(12) United States Patent
Ognev

(10) Patent No.: US 11,521,152 B2
(45) Date of Patent: Dec. 6, 2022

(54) CONFIGURATION MANAGEMENT FOR MODEL-BASED SYSTEMS ENGINEERING

(71) Applicant: The Boeing Company, Chicago, IL (US)

(72) Inventor: Ivan Ognev, Everett, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/892,926

(22) Filed: Jun. 4, 2020

(65) Prior Publication Data
US 2021/0383297 A1 Dec. 9, 2021

(51) Int. Cl.
*G06Q 10/06* (2012.01)
*G06Q 10/10* (2012.01)

(52) U.S. Cl.
CPC ..... *G06Q 10/067* (2013.01); *G06Q 10/06316* (2013.01); *G06Q 10/10* (2013.01); *G06Q 10/06313* (2013.01)

(58) Field of Classification Search
CPC ........... G06Q 10/06313; G06Q 10/067; G06Q 10/06316; G06Q 10/10
USPC .............................. 705/7.23, 7.26, 348, 342
See application file for complete search history.

(56) References Cited

U.S. PATENT DOCUMENTS

| 2016/0217172 A1* | 7/2016 | Azrieli | G06F 16/2365 |
| 2019/0188336 A1* | 6/2019 | Gottschlich | G06F 16/211 |
| 2020/0226220 A1* | 7/2020 | Eck | G06F 16/211 |

OTHER PUBLICATIONS

Duprez, An MBSE modeling approach to efficiently address complex systems and scalability, 28 INCOSE International Symposium 1 (2018) (Year: 2018).*

* cited by examiner

*Primary Examiner* — Charles Guiliano

(57) ABSTRACT

Solutions are provided for configuration management for model-based systems engineering (MBSE). An example includes: partitioning a system project into a baseline portion and a working portion; generating, in the working portion, a change package; generating, for the change package, an impact analysis, wherein generating the impact analysis comprises: based at least on change information, determining directly impacted elements; and based at least on the directly impacted elements, determining indirectly impacted elements; importing, from a baseline model into the change package, the directly impacted elements and the indirectly impacted elements; modifying at least one imported directly impacted element to generate a modified element; and integrating the modified element into the baseline model. Some examples further include generating a relation map indicating relationships among the directly impacted elements and the indirectly impacted elements to assist the impact analysis.

20 Claims, 14 Drawing Sheets

CONFIGURATION MANAGEMENT FOR MODEL-BASED SYSTEMS ENGINEERING

BACKGROUND

Model-based systems engineering (MBSE) uses domain models (e.g., models that incorporate both behavior and data) for information exchange. Managing model configuration changes for large, complex projects may be time-consuming and also prone to errors when potentially conflicting changes are input into automated configuration management tools. Some configuration management tools update elements outside the scope of an approved change. One of the current solutions for performing configuration management in a system model is using branching and merging. Branching creates a distinct copy of a project, allowing users to edit the branch copy, and, upon completion of edits to the branch, the branch is integrated back into the project trunk by a merge process.

Branching and merging has significant drawbacks, including high demands placed on server bandwidth and computer hardware, weak capability for performing change-on-change (e.g., changes built on other changes that are still in-work, or changes that overlap), and a propensity for merge failures (e.g., merge conflicts). For example, if an element is changed in the project trunk, the updated element will not be reflected in existing open branches unless it is manually added or resynced, which typically fails. An alternative approach of locking impacted elements severely curtails change control by only allowing a single user to edit the elements. As such users have to coordinate, often without the aid of automation, to avoid a conflict that can undesirably impact the trunk. Limited (or no) change control capability can limit the number of users who can work on a project simultaneously.

SUMMARY

The disclosed examples are described in detail below with reference to the accompanying drawing figures listed below. The following summary is provided to illustrate examples and implementations disclosed herein. It is not meant, however, to limit all examples to any particular configuration or sequence of operations.

Solutions are provided for configuration management for model-based systems engineering (MBSE). An example includes: partitioning a system project into a baseline portion and a working portion; generating, in the working portion, a change package; generating, for the change package, an impact analysis, wherein generating the impact analysis comprises: based at least on change information, determining directly impacted elements; and based at least on the directly impacted elements, determining indirectly impacted elements; importing, from a baseline model into the change package, the directly impacted elements and the indirectly impacted elements; modifying at least one imported directly impacted element to generate a modified element; and integrating the modified element into the baseline model. Some examples further include generating a relation map indicating relationships among the directly impacted elements and the indirectly impacted elements to assist the impact analysis.

The features, functions, and advantages that have been discussed are achieved independently in various examples or are to be combined in yet other examples, further details of which are seen with reference to the following description and drawings.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
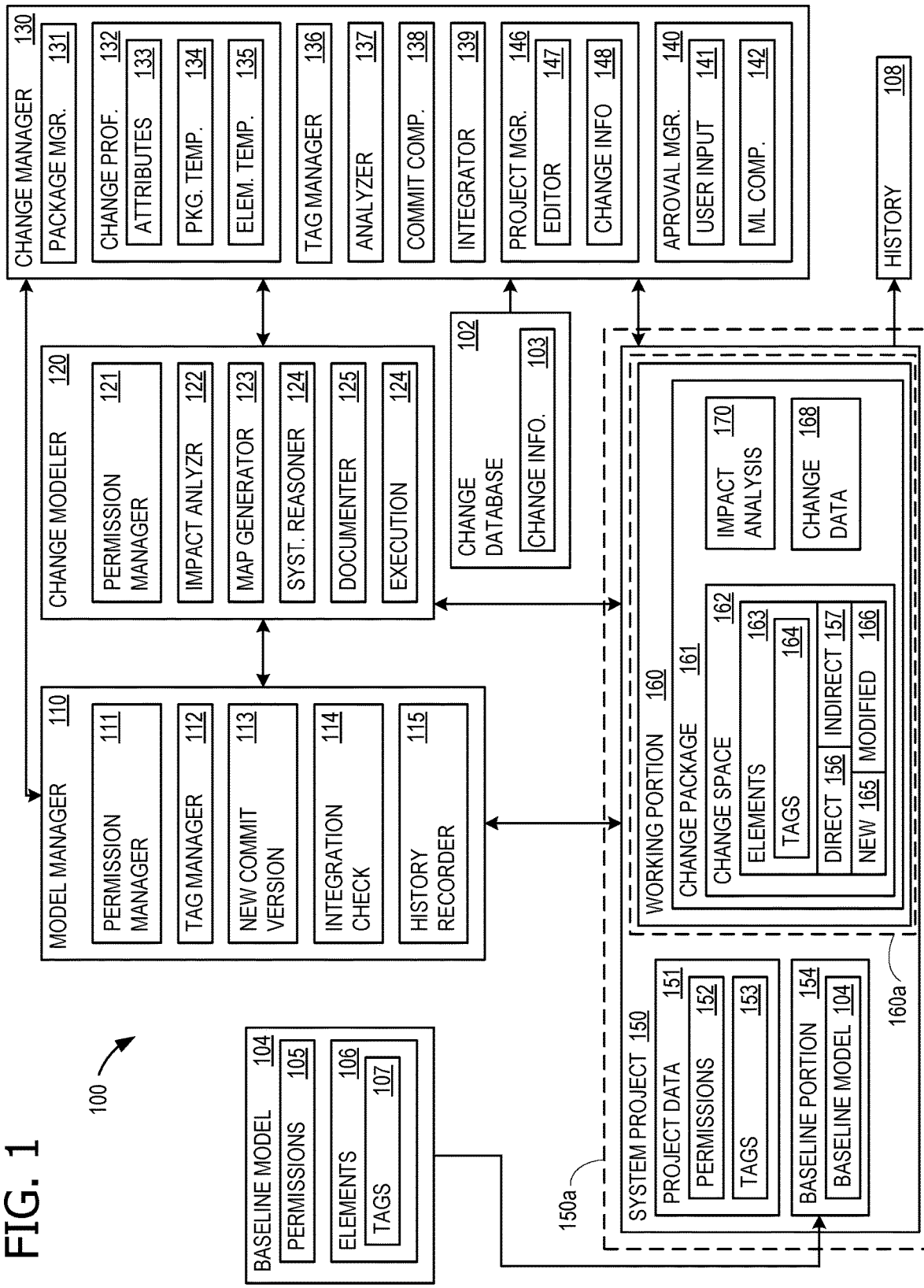
FIG. 1 illustrates an arrangement 100 that advantageously provides configuration management for model-based systems engineering (MBSE) in accordance with an example.

The various examples will be described in detail with reference to the accompanying drawings. Wherever possible, the same reference numbers will be used throughout the drawings to refer to the same or like parts. References made throughout this disclosure relating to specific examples. Descriptions of examples are provided for illustrative purposes but, unless indicated to the contrary, are not meant to limit all examples.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" or "one implementation" are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Disclosed configuration management solutions for model-based systems engineering (MB SE) identify and replace elements and their integrated sub-elements while avoiding unfavorable aspects of branching and merging techniques. Examples herein provide a structure within a system project that is divided into (1) a baseline portion that is under strict change control and (2) a working portion that is editable by a larger set of team members. During the development of a change, baseline and non-baseline elements are kept separate. When a change reaches maturity, the change is approved and integrated back into the baseline model, such that the non-baseline elements become the new baseline.

A unidirectional relationship between elements in the baseline package and the working package enables team members to see relevant concurrent changes to identify and resolve potential conflicts, while minimizing risks to the baseline model. If a baseline element is edited, the change in the baseline model element will manifest in the working portion element that modifies it, but it will not be overwritten automatically, in order to prevent baseline modifications from removing work in the working section. Conversely, if a working portion element is edited, the corresponding baseline model element will not be updated until an integration event occurs. Following a system change, an example performs an impact analysis to determine the impacts of the change on other elements. Data from the impact analysis is used for the identification of impacted elements (directly and indirectly) and propagated element changes.

Aspects of the disclosure offer greater visibility into system changes and enable change-on-change in a system model, while isolating in-work changes and avoiding the computationally intensive processes of branching and merging. Change-on-change is possible because elements that are impacted by multiple changes are linked through the unidirectional relationship. When a change is integrated into the baseline model, and a particular baseline model element changes, an update is carried to other open (in-work) change packages that are impacted by (e.g., relying upon or also changing) that same baseline model element. This enables team members to plan for upcoming changes and also gain an understanding of changes being worked by other teams.

Aspects of the disclosure provide opportunities for cost savings due to reducing or avoiding rework that is provided by the ability to handle change-on-change and proactively resolve potential conflicts. Cost savings also accrue via improved modeling tool performance and clear change histories.

In one example, elements and identifiers contain data describing relationships among elements (e.g., parent and child sub-element relationships). When changes are made, updates leverage the relationship information to propagate changes to specified elements and their related elements (e.g., sub-elements). In one example, permissions are set to limit editing permission for the baseline model to be a smaller group than the number of team members that have editing permissions for the working portion. In one example, changes may be visualized with a relation map that indicates relationships among elements impacted (directly or indirectly) by a change. In one example, project version (e.g., separating major revisions) are made available on a "read-only" basis for external users (e.g., the Federal Aviation Administration, or FAA). In one example, overlapping changes are coordinated, such as by using information from other changes that have not yet been integrated into the baseline model.

Aspects and examples disclosed herein are directed at configuration management for MB SE. An example includes: partitioning a system project into a baseline portion and a working portion; generating, in the working portion, a change package; generating, for the change package, an impact analysis, wherein generating the impact analysis comprises: based at least on change information, determining directly impacted elements; and based at least on the directly impacted elements, determining indirectly impacted elements; importing, from a baseline model into the change package, the directly impacted elements and the indirectly impacted elements; modifying at least one imported directly impacted element to generate a modified element; and integrating the modified element into the baseline model. Some examples further include generating a relation map indicating relationships among the directly impacted elements and the indirectly impacted elements to assist the impact analysis.

Referring more particularly to the drawings, FIG. 1 illustrates an arrangement 100 that advantageously provides configuration management for MB SE. The components of the arrangement 100 are described via reference to a process 200 that spans FIGS. 2A and 2B. Data relationships that may occur during the process 200 are illustrated in FIGS. 3 through 6B, which will be referenced throughout the descriptions of the arrangement 100 and the process 200. Aspects of the disclosure may be performed, for example, during the apparatus manufacturing and service method 1000 illustrated in FIG. 10, such as during specification and design 1002. The configuration management referred to herein may be, for example, for the apparatus 1100 shown in FIG. 11. The changes referred to herein may be, for example, changes to one or more of the plurality of systems 1204 (e.g., a propulsion system 1208, an electrical system 1210, a hydraulic system 1212, and an environmental system 1214) of the flying apparatus 1101 shown in FIG. 12.

Figure 9:
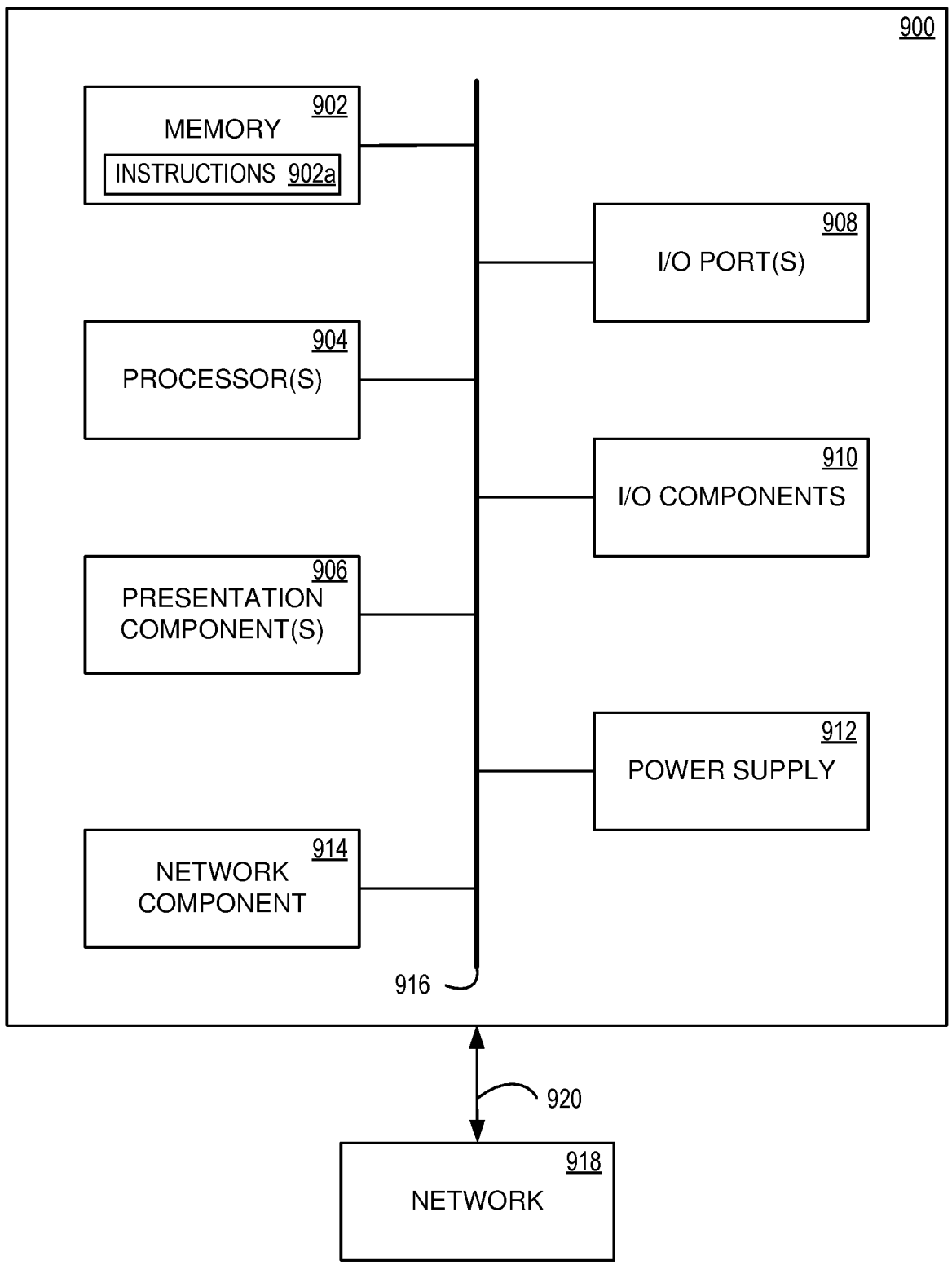
FIG. 9 is a block diagram of a computing device 900 suitable for implementing various aspects of the disclosure in accordance with an example.

As illustrated, the arrangement 100 includes a change database 102, a baseline model 104, a model manager 110, a change modeler 120, a change manager 130 that includes an approval manager 140, and a system project 150 with in a project repository 150a. In one example, the change database 102, the baseline model 104, the model manager 110, the change modeler 120, the change manager 130, the approval manager 140, and the system project 150 comprise data and computer executable instructions (e.g., instructions 904a) on a computing device 900, as illustrated in FIG. 9. A model developer (e.g., a user or team of users) will use the change modeler 120 and other components of the arrangement 100, for example, to model changes as described herein.

The change database 102 may be referred to as a trade study management tool (TSMT) that consolidates planned, in-work, and recently completed changes. In one example, the change database 102 is stored as a spreadsheet, with change information 103 stored as an entry. The change information 103 will be used for the system project 150. The project repository 150a may additionally hold other system projects that correspond to other sections of the system architecture. The baseline model 104 has a set of permissions 105 that tightly restrict editing privileges to a select set of users, although a wider set of teams, users, and other entities (e.g., application software being executed with a particular user's credentials) may have read privileges. The baseline model 104 holds the reference elements 106 that are used as a baseline by various teams and users working on multiple efforts.

The elements 106 have tags 107 that indicate identifiers, dates, such as the most recent revision, whether the element is from the baseline, parent-child relationships (e.g., indicating whether one element 106 is a sub-element of another element 106), and other information relevant to the management of the elements 106 in the baseline model 104. A revision history 108 provides record-keeping of system projects that may have already been integrated into the baseline model 104. For example, when the system project 150 is integrated into the baseline model 104 (as will be described later), this event will be indicated in the history 108.

Figure 2A:
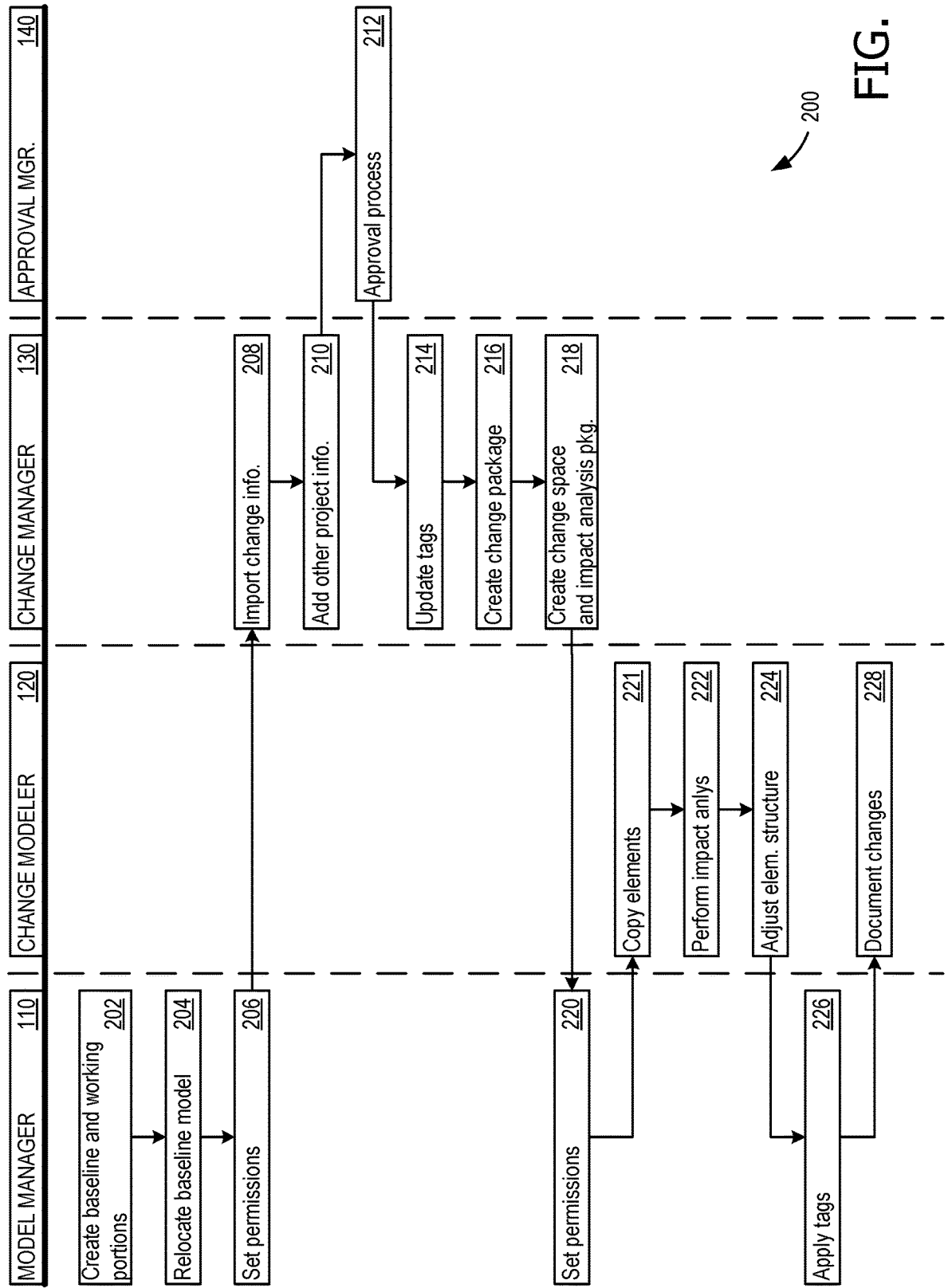
FIGS. 2A and 2B together form a block diagram illustrating a process 200 of configuration management for MBSE, as may be used with the arrangement 100 of FIG. 1 in accordance with an example.
Figure 2B:
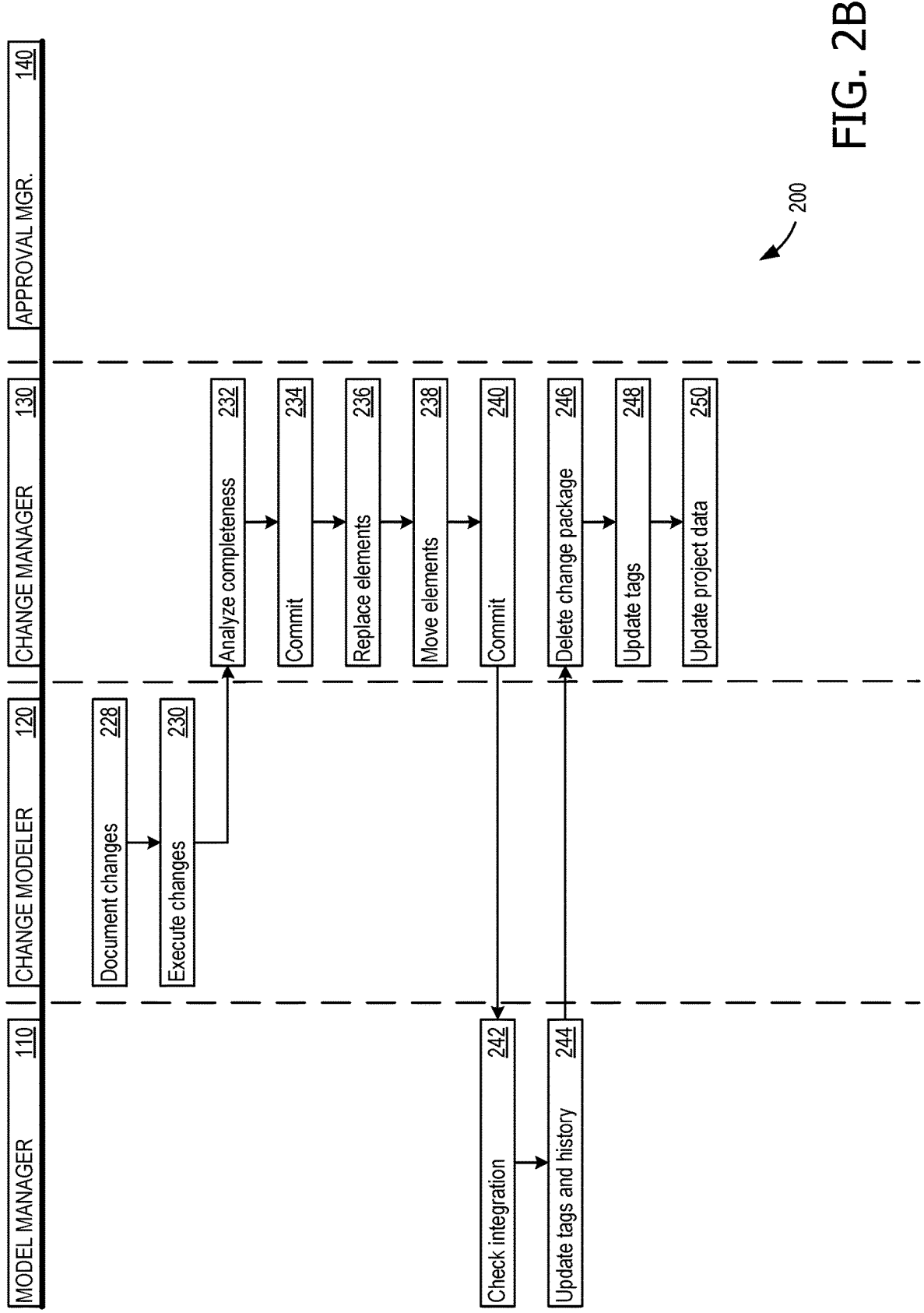

With continued reference to FIG. 1, the process 200 of FIGS. 2A and 2B will now be described. FIGS. 2A and 2B illustrate a series of operations 202-250 that are performed by model manager 110, a change modeler 120, a change manager 130 that includes an approval manager 140, using and/or operating upon the change database 102, the baseline model 104, and the system project 150. The early stages of the process 200 partitions the system project into a working section (e.g., a working package 160*a*) and a baseline portion 154. In operation 202, the working package 160*a* and the baseline portion 154 are created in the system project 150. The system project 150 has project data 151, which includes permissions 152 that grant read/write access to the system project 150 and its various components, such as a working portion 160 in the working package 160*a*. The working package 160*a* contains the working portion 160; the working portion 160 holds the series of changes that are being developed.

Tags 153 store metadata information that is relevant to the system project 150 and the working portion 160. The tags 153 may include identifiers, dates, a title, and descriptions of changes for the underlying project effort.

Operation 204 includes relocating the baseline model 104 to the baseline portion 154 copying the baseline model elements 106 to the change package 161 in the system project 150. Permissions 152 are set in operation 206, using a permission manager 111 or a permission manager 121 in the change modeler 120. The permission manager 111 (or another permission manager) may also set the permissions 105.

The change manager 130 imports the change information 103 from the change database 102 in operation 208 and placed into the system project 150, for example within the tags 153, and also may be used in constructing the working portion 160. The change information 103 may also be imported into a project manager 146, specifically an editor 147, that enhances the change information 103 into the edited change information 148. The change information 148 may be placed into the system project 150 in operation 210. In operation 212, an approval manager 140 approves the change, using either user input 141 from a human user or machine learning (ML) or artificial intelligence (AI, together ML) via an ML component 142. A tag manager 136 updates the tags 153, for example to indicate that the change has been approved and is now an "in-work" change, in operation 214.

In operation 216, a package manager 131 generates, in the system project 150, a change package 161 within the working portion 160. This includes importing the change information 103 from the change database 102 directly, or indirectly as the change information 148. A change space 162 and the impact analysis 170 (or at least placeholder templates) may be created in operation 218. The change space 162 is where the actual changes are modeled. A change profile 132 is applied to the change package 161 to generate a uniform set of tag fields in change data 168. The change profile 132 includes an attributes template 133, a package template 134, and an element template 135. The attributes template 133 may include fields such as Name, Approving Authority, Description, Approved, Dates (Initiation, Charter, Closure), Modeling Change Description, Title, Status ID, Status Name, Priority, Change Incorporation (status of change modeling, "in-work" or "complete"), Affected Projects, and Modeling Change Type (data or architecture). The attributes template 133 may be populated by or applied to the change information 103 or 124 (which is copied into the change data 168).

The package template 134 is applied to the change package 161 and may include fields such as Changes Incorporated (e.g., an integer value stating how many changes have been incorporated) and Last Revision Incorporated (e.g., a string value of the most recent revision from the history 108). These fields may be used to ascertain whether other change packages reflect the latest (most current) baseline model 104. In some examples, changes to the baseline model 104 are not automatically propagated to the change package 161, but instead may be incorporated at the discretion of the modeler. That is, the purpose of these fields is to ensure that impacts of changes that are integrated into the baseline model 104 reflect changes to the current baseline, rather than a prior (out-of-date) baseline. The element template 135 may include fields such as Is Baseline (e.g., a Boolean value that outputs True if the element was/is part of the baseline model 104 and False if the element is newly created in the working portion 160), and Last Revision Edited (e.g., an integer value that identifies the change number at which the most recent element was edited). This information is applied to elements 163, for example within tags 164).

Figure 3:
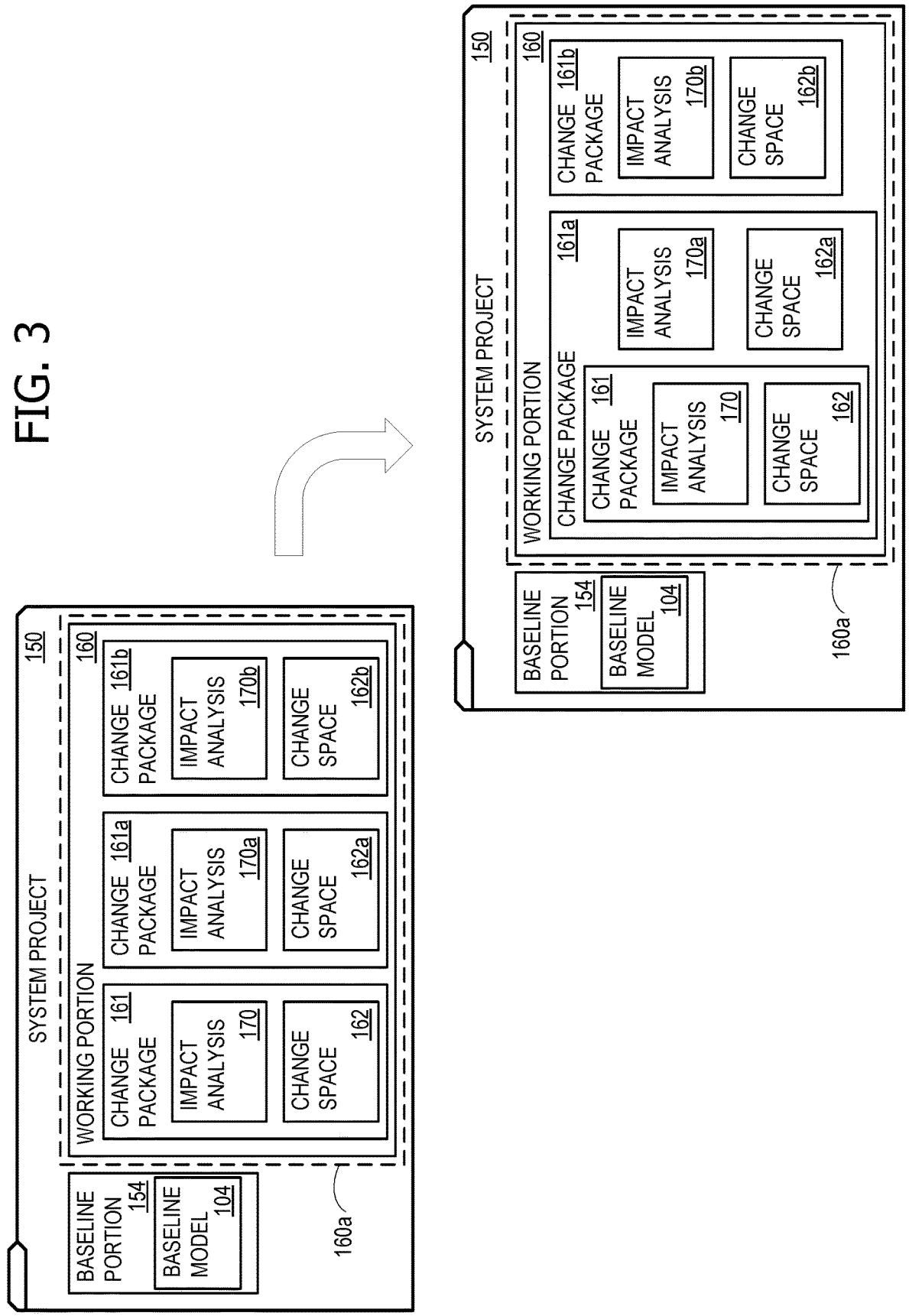
FIG. 3 illustrates data relationships that may occur during the process 200 of FIGS. 2A and 2B in accordance with an example.

The structure of the system project 150 is shown in further detail in FIG. 3. As illustrated, the working portion 160 may include multiple change packages, for example change package 161, change package 161*a*, and change package 161*b*. Each of the change packages 161-161*b* represents a different change. For example, each of the change packages 161-161*b* may relate to a lavatory, such as changing a lighting solution or adding an additional lavatory to the flying apparatus 1101. In such an example, it may be beneficial to process one change first, such as a modification to the lavatory, prior to adding an additional lavatory. In this way, the change to the lavatory itself is propagated to the additional lavatory, rather than adding a lavatory, both of which need to have the lighting solution changed. Thus, FIG. 3 indicates that the change package 161 may be nested into the change package 161*a*.

Additional examples include removing a display from the flight deck, changing mechanical flight controls to fly by wire, or modifying the flight control laws executed by a flight control computer. Changes may be implemented in systems engineering documentation files, for example XML files, that specify how components interact and relate to each other both physically (e.g., wiring) and functionally. Further nesting of changes may occur, if necessary, to place the change package 161*a* into the change package 161*b* so that the system project 150 may be completed. The impact analysis 170 provides aids in understanding the scope of a change and may be used to determine additional ones of the elements 106 that are needed for the elements 163.

Figure 4:
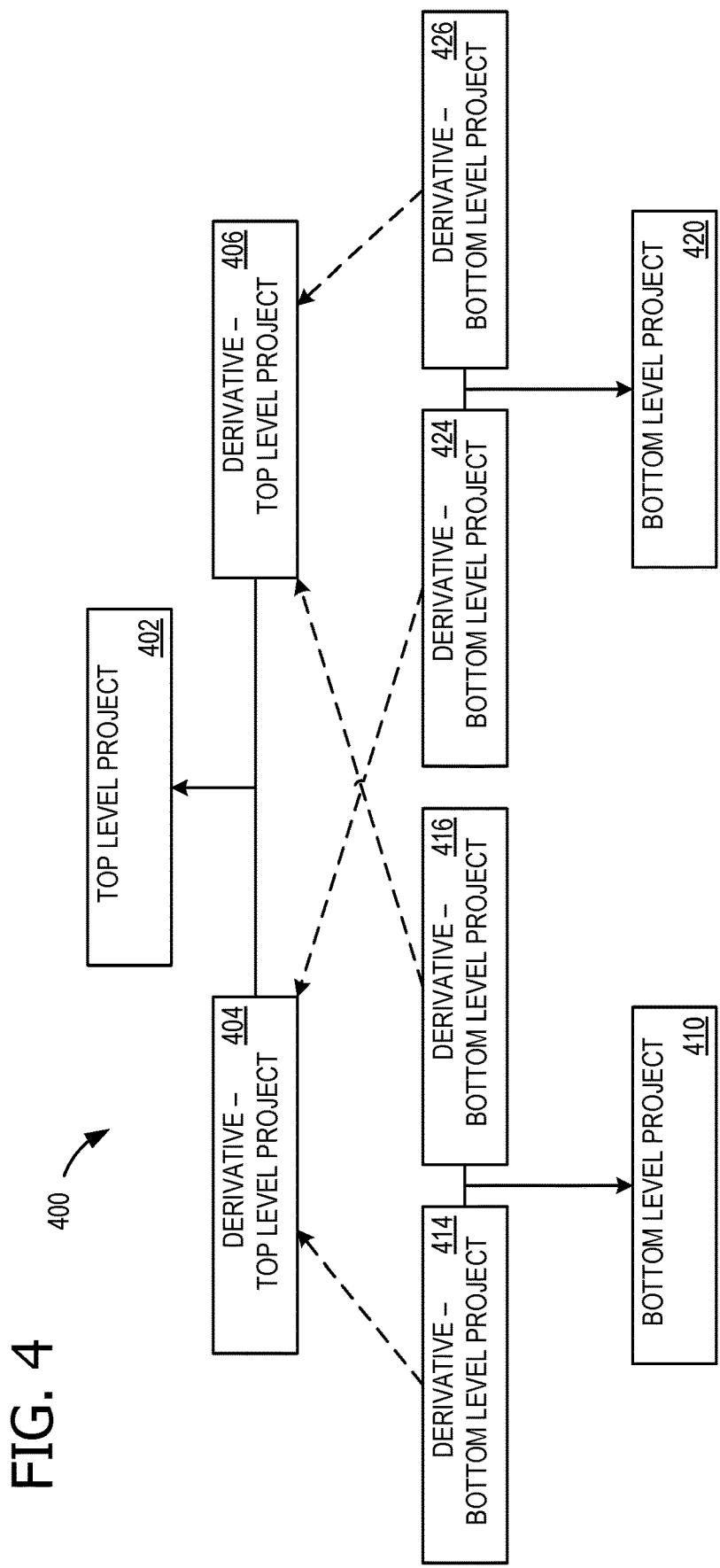
FIG. 4 also illustrates data relationships that may occur during the process 200 of FIGS. 2A and 2B in accordance with an example.

This hierarchical relationship among change packages 161 and 161a within the system project 150 is not the only potential advantageous hierarchical relationship. FIG. 4 illustrates relationships among projects. A project revision is an official version of the project that may cross several typical commit versions or a single one. It is designed to differentiate between major changes that have occurred between baselines and can enable version control when sharing models with suppliers and regulators. The project revision branch is a snapshot of the system model trunk at a point in time when modelers determine that significant changes have been made to the baseline at a specific commit version. Additionally, the revision branch may be used as a project usage within other projects. This approach may limit the number of times a project usage will need to be updated, enabling better versioning, as the project usage will typically need to be updated only when a new revision of the project is released.

When model development reaches a point where derivatives may be made, derivative branches may be created. A relationship 400 shows two derivatives, a derivative 404 and a derivative 406, both of a top-level project 402. Each of the top-level project 402, a bottom level project 410, and a bottom level project 420 may have its one project (e.g., its own version of the system project 150). The derivatives 404 and 406 are generated using the bottom level projects 410 and 420. As illustrated, the derivative 404 uses branch 414 and branch 424 that are part of the derivative 404 from both bottom level projects 410 and 420. Similarly, the derivative 406 uses branch 416 and branch 426 that are part of the derivative 406 from both bottom level projects 410 and 420. In this manner, simultaneous changes (e.g., change-on-change) may be advantageously accomplished.

The permission manager 111 sets the permissions 152 in operation 220, for example by identifying the team members and other users who have reading and editing privileges for the different portions of the system project 150. The change package 161 has elements 163 that are a copied in operation 221, from at least a portion of the elements 106, including the related tags 107 that may be relevant to the system project 150. That is, the elements 106 that may be impacted (directly or indirectly) by the system project 150 are copied into the elements 163. An impact analysis 170 may have already been generated to identify the copied elements 163, but further updates to the impact analysis 170 may trigger copying additional elements 106 into elements 163.

Figure 5:
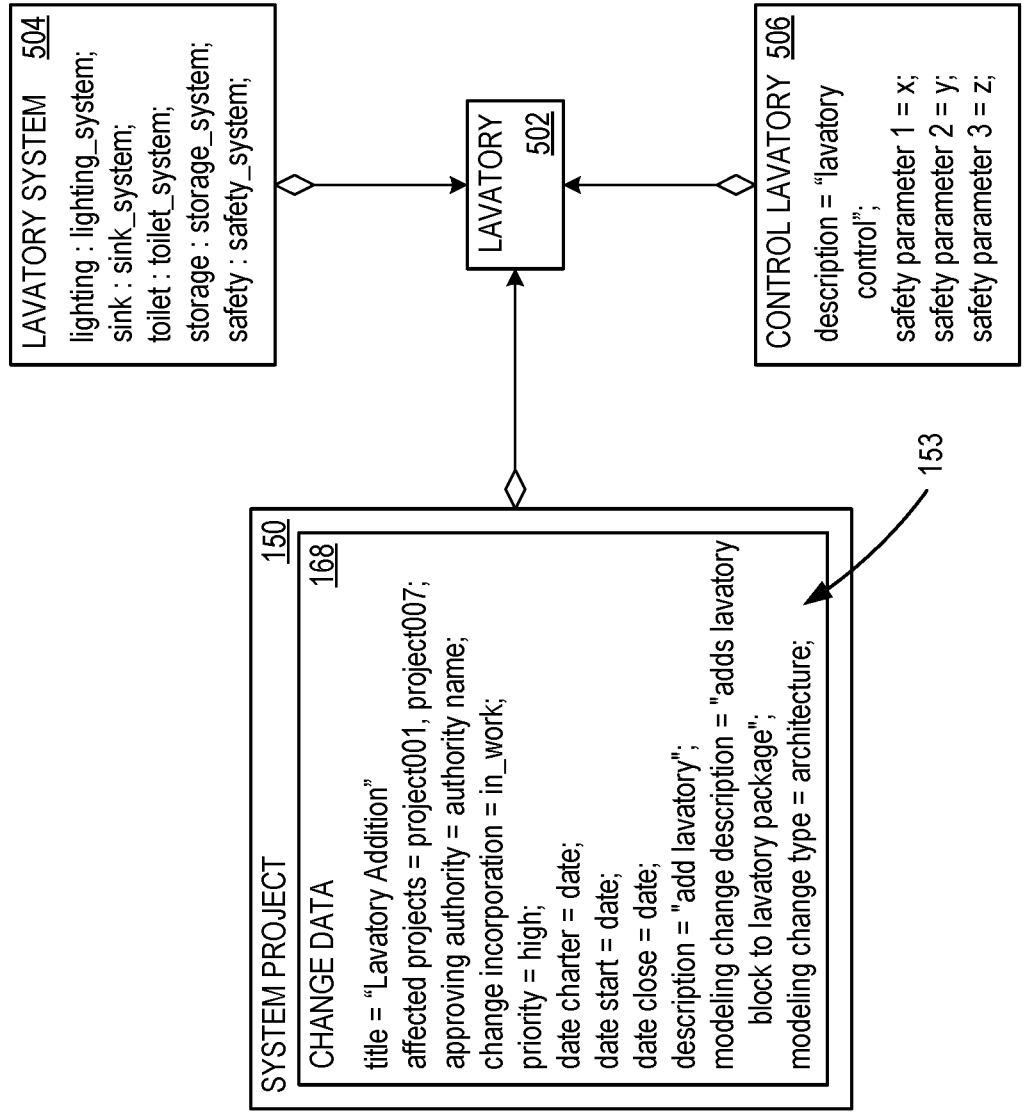
FIG. 5 also illustrates data relationships that may occur during the process 200 of FIGS. 2A and 2B in accordance with an example.

An impact analyzer 122 generates or updates the impact analysis 170 in operation 222, for example by filling in data, if an earlier template or placeholder had been created. An example of the change data 168 is illustrated in FIG. 5 for a lavatory element 502 that may be one of the elements 163 or imported from elements 106. The change data 168 information comes from change information 148. Data for a lavatory system 504 and a control lavatory function 506 are also shown, indicating inherited data and references to other elements 163. When operation 222 generates (or updates) the impact analysis 170, it uses the change information 148 to determine directly impacted elements 156. The directly impacted elements 156 are those elements 163 that are changed directly by the change package 161. Based at least on the directly impacted elements 156, operation 222 also determines indirectly impacted elements 157. Further, operation 222 imports, from the baseline model 104 into the change package 161, the directly impacted elements 156 and the indirectly impacted elements 157. The directly impacted elements 156 and the indirectly impacted elements 157 live within the baseline model 104 before they are brought into the change package 161. As indicated, importing from the baseline model 104 into the change package 161 comprises importing from the baseline model 104 into the change space 162 in the change package 161. With brief reference to FIG. 3, for impact analyses on other change packages (e.g., the impact analysis 170a and 170b, a set of directly and indirectly impacted elements will be determined and imported for change spaces 162a and 162b, respectively.

Figure 6A:
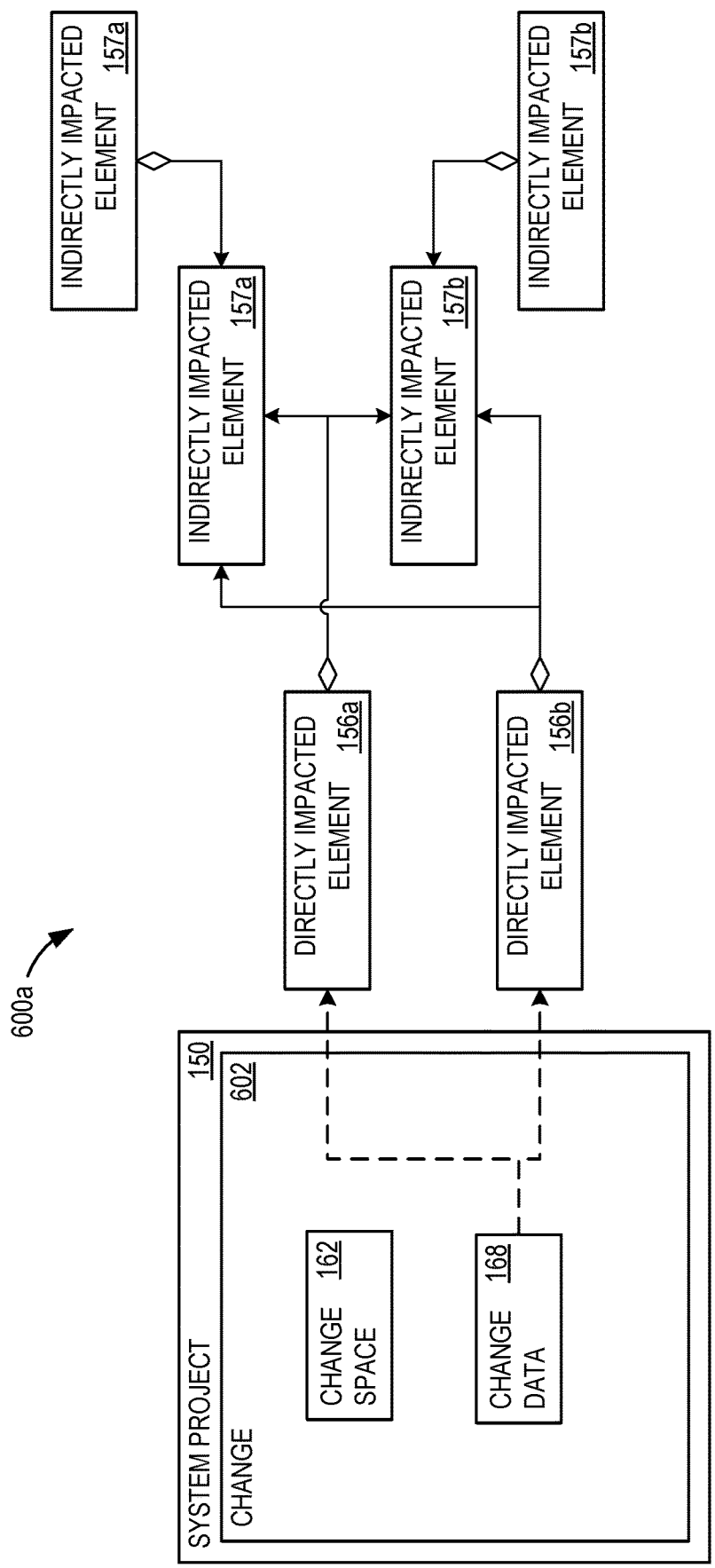
FIGS. 6A and 6B also illustrate data relationships that may occur during the process 200 of FIGS. 2A and 2B in accordance with an example.
Figure 6B:
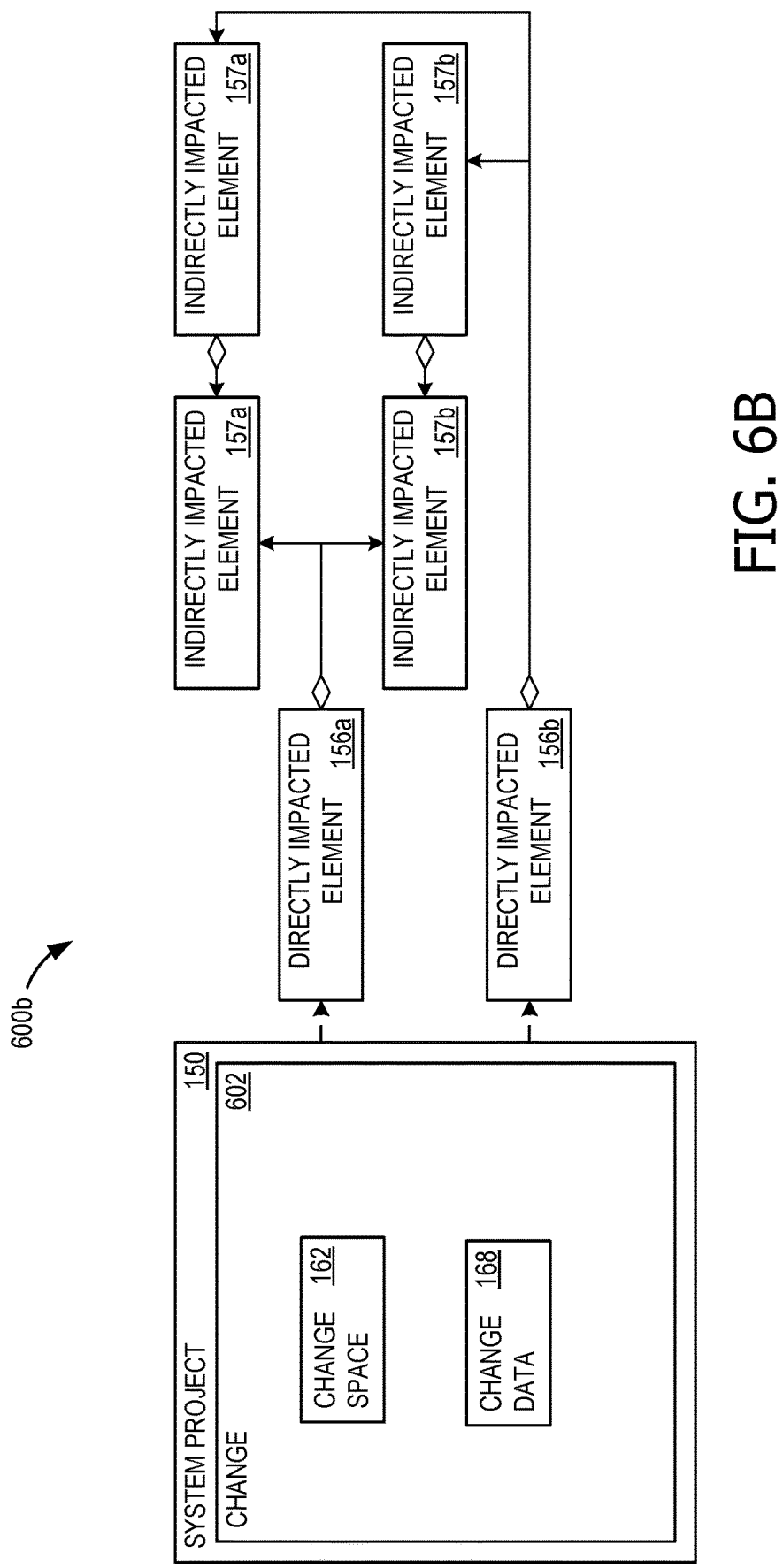

A map generator 123 uses the impact analysis 170 to generate a relation map 600a, as shown in FIG. 6A, indicating relationships among the directly impacted elements 156 and the indirectly impacted elements 157. The directly impacted elements 156 shown in the relation map 600a are directly impacted element 156a and directly impacted elements 156b. Similarly, the indirectly impacted elements 157 shown in the relation map 600a are indirectly impacted element 157a and indirectly impacted elements 156b. The relation map 600a connects a change 602 to the directly impacted elements 156a and 156b, as the directly impacted elements 156a and 156b are realizing the change. As illustrated, for example, the directly impacted elements 156a and 156b impact the indirectly impacted elements 157a and 157b, respectively. It should be understood that relation map 600a is notional, and a different number of elements (both directly impacted and indirectly impacted) may be included in other examples. The impact analysis 170 identifies change-specific attributes. In one example, the map generator 123 may be able to show all possible related elements that can exist for a potential element type.

When the impacted elements (the directly impacted elements 156 and the indirectly impacted elements 157) are brought into the change space 162 (e.g., directly impacted elements 156 and the indirectly impacted elements 157 are copied from elements 106 to elements 163), the relationships between the elements 163 in the working portion 160 are modified by a system reasoner 124 in operation 224. The relationships now reference the element counterparts in the elements 163 rather than in the elements 106 in the baseline model 104. However, the edges (links back to elements 106 that were not imported into elements 163) remain linked to the elements 106. Tags 164, tags 153, and/or tag data within the change data 168 are applied or updated in operation 226 by a tag manager 112.

The change 602 may now be further modeled, by creating, modifying, or deleting elements 163 within the change space 162. This produces modified elements 166. If new elements 165 are created, they are provided with the attributes template 133, which is populated. Additionally, changes and additions are documented with the documenter 125 in operation 228. Based at least on modifying the imported directly impacted element 156 (to produce the modified element 166) the impact analysis 170 is updated. The change 602 is executed by an execution component 126, in operation 230. An updated relation map 600b is illustrated in FIG. 6, showing the result of change execution and propagation among the elements 163.

In operation 232, an analyzer 137 analyzes the completeness of the change package 161, which may include user input, and or use ML. The analyzer 137 may check, for example, the Changes Incorporated and Last Revision Incorporated field (populated from the package template 134). These fields may be used to determine whether the change package 161 is current with the baseline model 104. If a discrepancy exists, the current change being modeled does not reflect the current baseline model 104, and the change package 161 is updated to reflect the current baseline model 104. This scenario may occur if another system project had been integrated into the baseline model 104 after the relevant elements of the baseline model 104 had been copied into the change package 161 (in operation 204). Also, there may be verification that the modeling content within the change package 161 matches the intent of the change. If both checks are successfully passed, the change manager 130 performs the initial change documentation to gather information regarding attribute-level changes. The initial change documentation may be performed in the impact analysis 170 using a series of tables. As both the current and future version of the impacted elements exist (e.g., current version as elements 106 and future version as elements 163), it is possible to create a comparison of element attributes for archival.

To perform the integration, the change manager 130 commits the system project 150 using a commit component 138. In one example, an annotation is made stating the change to be incorporated and the name of the specific change. The change manager 130 locks the baseline model 104, preventing all other change modeling from occurring in a first commit operation 234, and proceeds to replace and/or move the elements 163 into the baseline model 104 in operations 236 and 238, using an integrator 139. In one example, this begins with the highest level (most senior parent) element moving downwards (to the bottom child). The elements 106 having a corresponding modified element 166 are replaced, whereas new elements 165 are newly added to baseline model 104. A newly copied element 106 inherits relationships from the prior version of the same element 106. This produces a new commit version 113. A second commit operation 240 finishes the integration and may unlock the baseline model 104.

The model manager 110 checks the new commit version 113 for consistency, accuracy, and completeness (e.g., no missing fields or incorrect data) in operation 242, using an integration check component 114. The tags 107 are updated, if necessary, with the tag manager 112, and the history 108 is updated with a history recorder 115. For example, the current (newly updated) baseline model 104 may be compared with the immediately prior version, and the differences entered into the history 108. The change package 161 may now be deleted in operation 246. If the system project 150 remains open, the tags 153 are updated in operation 248 and the project data 151 are further updated in operation 250, to reflect the state of the change package 161 having been completed and deleted. Any other change package (e.g., the change package 161b) remaining in the system project 150 may now be worked upon.

Thus, in one example, the arrangement 100 comprises a system for configuration management for MBSE, the system comprising: one or more processors 904; and a memory 902 storing instructions 902a that, when executed by the one or more processors 904, cause the one or more processors 904 to perform operations comprising: generating, in the system project 150, the change package 161; copying baseline model elements 106 from the baseline model 104 to the change package 161 in the system project 150; generating, for the change package 161, the impact analysis 170, wherein generating the impact analysis 170 comprises: based at least on the change information 148, determining the directly impacted elements 156; and based at least on the directly impacted elements 156, determining the indirectly impacted elements 157; importing, from the baseline model 104 into the change package 161, the directly impacted elements 156 and the indirectly impacted elements 157; modifying at least one imported directly impacted element 156 to generate a modified element 166; and integrating the modified element 166 into the baseline model 104.

Figure 7:
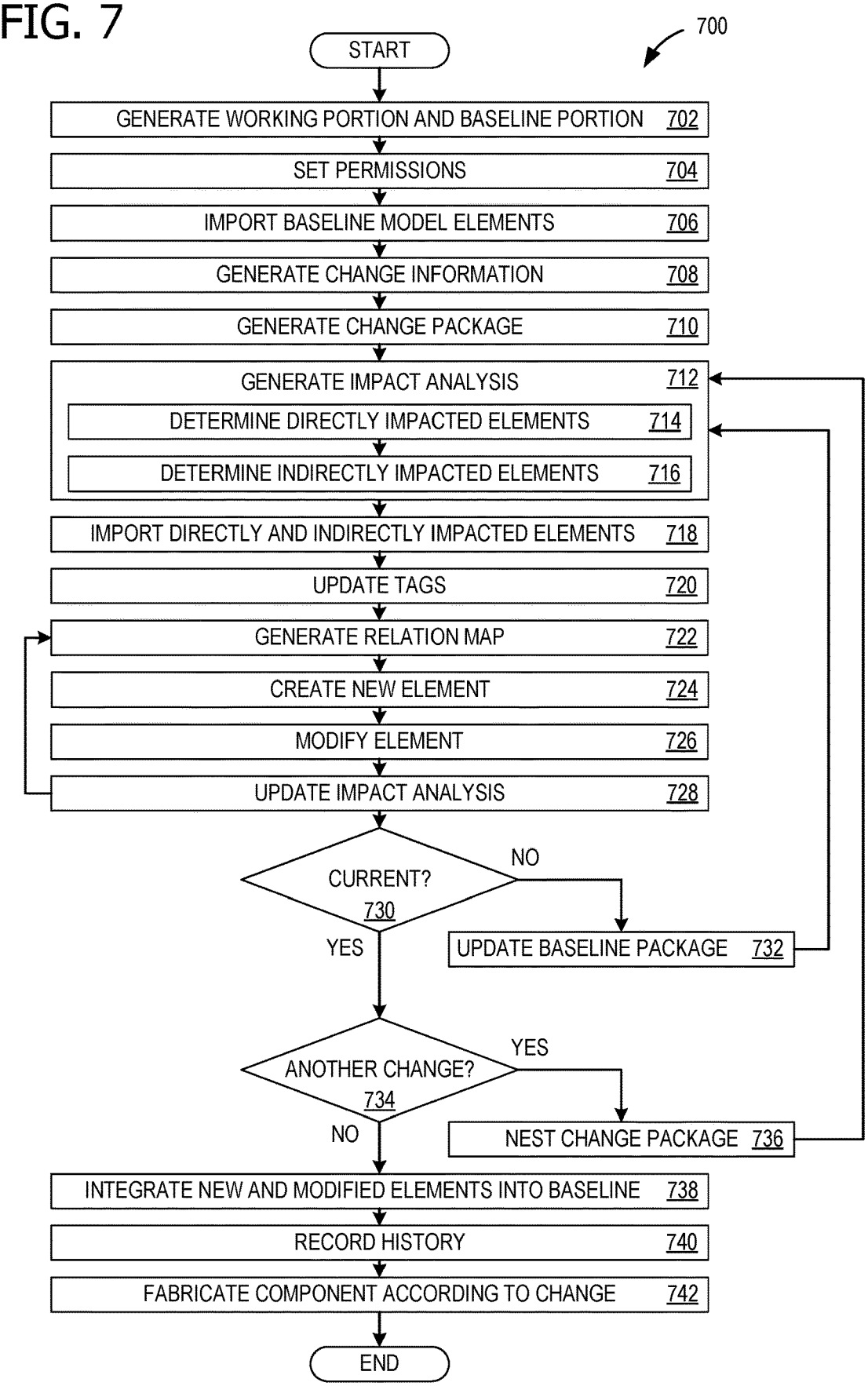
FIG. 7 is a flow chart 700 illustrating a method of configuration management for MBSE, as may be used with the arrangement 100 of FIG. 1 in accordance with an example.

With reference now to FIG. 7, a flow chart 700 illustrates a method of configuration management for MBSE, as may be used with the arrangement 100 of FIG. 1. In one example, the operations illustrated in FIG. 7 are performed, at least in part, by executing instructions 902a by the one or more processors 904 of the computing device 900 of FIG. 9. Operation 702 includes generating the change information 103 in the change database 102. Operation 704 includes setting the permissions 152 for the system project 150. Operation 706 includes importing baseline model 104 (including the baseline model elements 106) into the system project 150. Operation 708 includes generating the change information 103 and/or 148 Operation 710 includes generating, in the system project 150, the change package 161. In one example, generating, in the system project 150, the change package 161 comprises importing the change information 103 from the change database 102, for example, directly or via the change modeler 120 as the change information 148.

Operation 712 includes generating, for the change package 161, the impact analysis 170. The impact analysis 170 determines downstream and upstream impact of changes on other elements 106 and 163. Generating the impact analysis 170 in operation 712 comprises operations 714 and 716: Operation 714 includes, based at least on change information 103 or 148, determining the directly impacted elements 156, and operation 716 includes, based at least on the directly impacted elements 156, determining the indirectly impacted elements 157.

With the directly impacted elements 156 and the indirectly impacted elements 157 thus determined, operation 718 includes importing, from the baseline model 104 into the change package 161, the directly impacted elements 156 and the indirectly impacted elements 157. In this manner, only the likely potentially relevant scope of the elements 106 that is impacted is imported. In one example, importing from the baseline model 104 into the change package 161 comprises importing from the baseline model 104 into the change space 162 in the change package 161. Operation 720 includes updating the tags 164. In one example, updating the tags 164 comprises assigning unique identifiers to the directly impacted elements 156 and the indirectly impacted elements 157 that describe relationships among the elements 163 (e.g., parent and child or sub-elements). When changes are made, this relationship information may be used to identify which elements 163 require updating.

Operation 722 includes generating a relation map (e.g., the relation map 600a) indicating relationships among the directly impacted elements 156a and 156b and the indirectly impacted elements 157a and 157b. Operation 724 includes creating the new element 165 within the change package 161. More than one new element 165 may be created. Operation 726 includes modifying at least one imported directly impacted element 156 to generate the modified element 166. More than one modified element 166 may be modified. Operation 728 includes, based at least on modifying the imported directly impacted element 156 or, based at least on creating the new element 165, updating the impact analysis 170. The user may wish to return to operation 722 to update the relation map 600a or 600b, and or create or modify additional elements 163.

A decision operation 730 determines whether the change package 161 is current. For example, some of the elements 163 in the change package 161 may be out of date relative to the corresponding elements 106 in the baseline model 104. This may have occurred if, while one user was working on the system project 150, another user had completed a different change and integrated those changes into the baseline model 104, replacing some of the elements 106 that had earlier been imported into the change package 161 (as the elements 163). If the change package 161 is not current, operation 732 includes, based at least on the change package 161 not being current, updating the change package 161. The flow chart 700 returns to operation 712 to address any potential conflicts between the new elements 165 and/or the modified elements 166 and any intervening changes made to the elements 106.

If the change package 161 is current with the baseline model 104, a decision operation 734 determines whether the change package 161 has additional changes. If so, changes are nested in the order in which they should be executed, for example, modifying a sub-element prior to including additional manifestations of that sub-element in a parent element. Thus, operation 736 includes nesting the change package 161 into the second change package 161a. The flow chart 700 returns to operation 712 to address the second change package 161a.

When all change packages 161, 161a, and 161b in the system project 150 have been addressed, operation 738 includes integrating the new element 165 into the baseline model 104 and integrating the modified element 166 into the baseline model 104. The integration process may be as described above, with commit-integrate-commit stages. Operation 740 includes recording the integration of the modified element 166 and/or the new element 165 in the revision history 108. Operation 740 includes fabricating a component of the apparatus 1100 in accordance with the new element 165 or the modified element 166. For example, operation 740 may include fabricating a propulsion system 1208, an electrical system 1210, a hydraulic system 1212, and an environmental system 1214 of the flying apparatus 1101. (See FIGS. 11 and 12).

Figure 8:
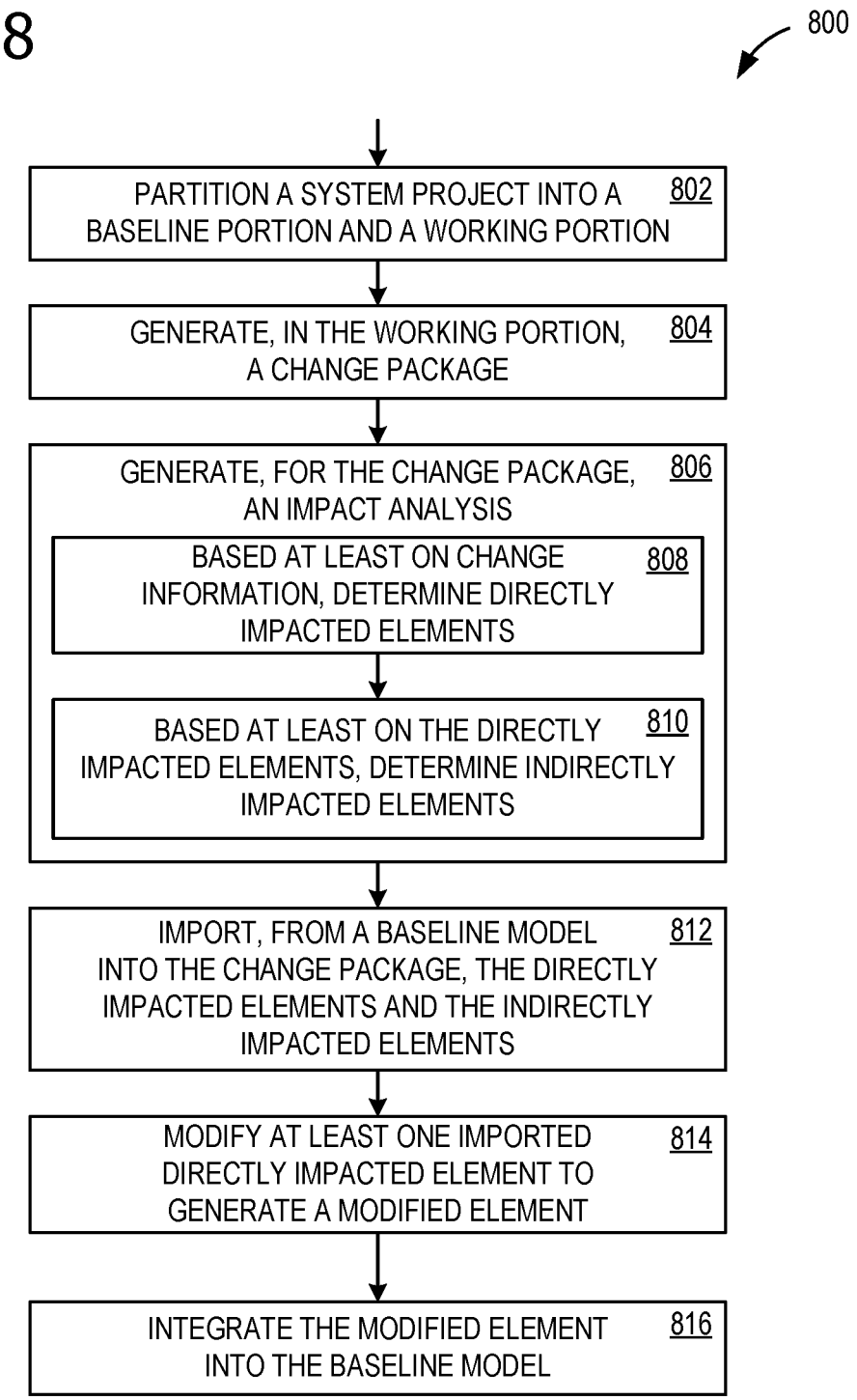
FIG. 8 is a flow chart 800 illustrating a method of configuration management for MBSE, as may be used with the arrangement 100 of FIG. 1 in accordance with an example.

FIG. 8 shows a flow chart 800 illustrating a method of configuration management for MBSE. In one example, operations illustrated in FIG. 8 are performed, at least in part, by executing instructions by the one or more processors 904 of the computing device 900 of FIG. 9. In one example, operation 802 includes partitioning a system project into a baseline portion and a working portion. Operation 804 includes generating, in the working portion, a change package. Operation 804 includes generating, for the change package, an impact analysis, wherein generating the impact analysis comprises operations 808 and 810. Operation 808 includes, based at least on change information, determining directly impacted elements. Operation 810 includes, based at least on the directly impacted elements, determining indirectly impacted elements. Operation 812 includes importing, from a baseline model into the change package, the directly impacted elements and the indirectly impacted elements. Operation 814 includes modifying at least one imported directly impacted element to generate a modified element. Operation 816 includes integrating the modified element into the baseline model.

With reference now to FIG. 9, a block diagram of the computing device 900 suitable for implementing various aspects of the disclosure is described. In some examples, the computing device 900 includes one or more processors 904, one or more presentation components 906 and the memory 902. The disclosed examples associated with the computing device 900 are practiced by a variety of computing devices, including personal computers, laptops, smart phones, mobile tablets, hand-held devices, consumer electronics, specialty computing devices, etc. Distinction is not made between such categories as "workstation," "server," "laptop," "handheld device," etc., as all are contemplated within the scope of FIG. 9 and the references herein to a "computing device." The disclosed examples are also practiced in distributed computing environments, where tasks are performed by remote-processing devices that are linked through a communications network. Further, while the computing device 900 is depicted as a seemingly single device, in one example, multiple computing devices work together and share the depicted device resources. For instance, in one example, the memory 902 is distributed across multiple devices, the processor(s) 904 provided are housed on different devices, and so on.

In one example, the memory 902 includes any of the computer-readable media discussed herein. In one example, the memory 902 is used to store and access instructions 902a configured to carry out the various operations disclosed herein. In some examples, the memory 902 includes computer storage media in the form of volatile and/or nonvolatile memory, removable or non-removable memory, data disks in virtual environments, or a combination thereof. In one example, the processor(s) 904 includes any quantity of processing units that read data from various entities, such as the memory 902 or input/output (I/O) components 910. Specifically, the processor(s) 904 are programmed to execute computer-executable instructions for implementing aspects of the disclosure. In one example, the instructions are performed by the processor, by multiple processors within the computing device 900, or by a processor external to the computing device 900. In some examples, the processor(s) 904 are programmed to execute instructions such as those illustrated in the flow charts discussed below and depicted in the accompanying drawings.

The presentation component(s) 906 present data indications to an operator or to another device. In one example, presentation components 906 include a display device, speaker, printing component, vibrating component, etc. One skilled in the art will understand and appreciate that computer data is presented in a number of ways, such as visually in a graphical user interface (GUI), audibly through speakers, wirelessly between the computing device 900, across a wired connection, or in other ways. In one example, presentation component(s) 906 are not used when processes and operations are sufficiently automated that a need for human interaction is lessened or not needed. I/O ports 908 allow the computing device 900 to be logically coupled to other devices including the I/O components 910, some of which is built in. Examples of the I/O components 1810 include, for example but without limitation, a microphone, keyboard, mouse, joystick, game pad, satellite dish, scanner, printer, wireless device, etc.

The computing device 900 includes a bus 916 that directly or indirectly couples the following devices: the memory 902, the one or more processors 904, the one or more presentation components 906, the input/output (I/O) ports 908, the I/O components 910, a power supply 912, and a network component 914. The computing device 900 should not be interpreted as having any dependency or requirement related to any single component or combination of components illustrated therein. The bus 916 represents one or more busses (such as an address bus, data bus, or a combination thereof). Although the various blocks of FIG. 9 are shown with lines for the sake of clarity, some examples blur functionality over various different components described herein.

In some examples, the computing device 900 is communicatively coupled to a network 918 using the network component 914. In some examples, the network component 914 includes a network interface card and/or computer-executable instructions (e.g., a driver) for operating the network interface card. In one example, communication between the computing device 900 and other devices occur using any protocol or mechanism over a wired or wireless connection 920. In some examples, the network component 914 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 900, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 10:
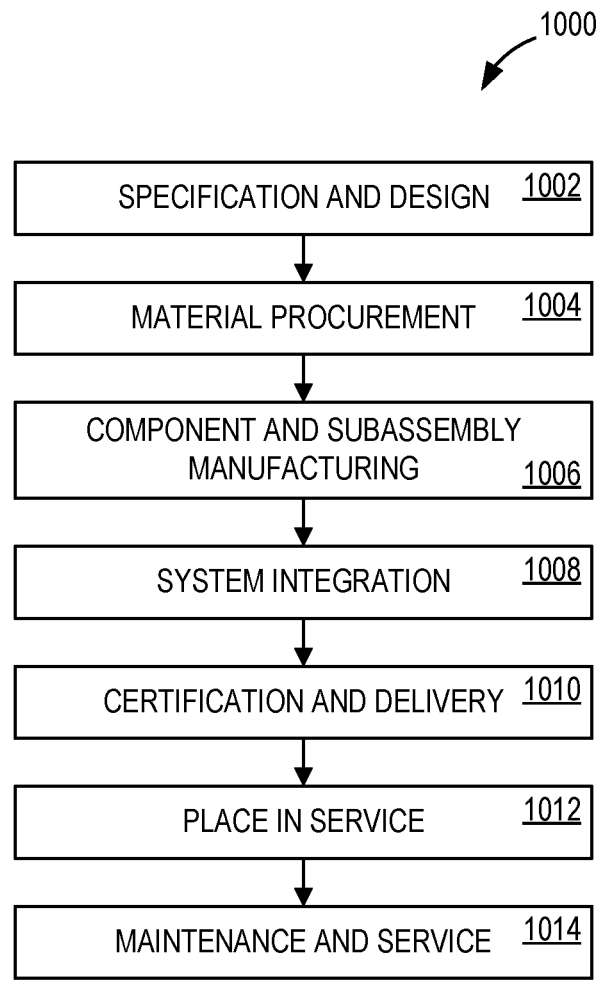
FIG. 10 is a block diagram of an apparatus production and service method 1000 that advantageously employs configuration management for MBSE, for example during specification and design 1002 in accordance with an example.
Figure 11:
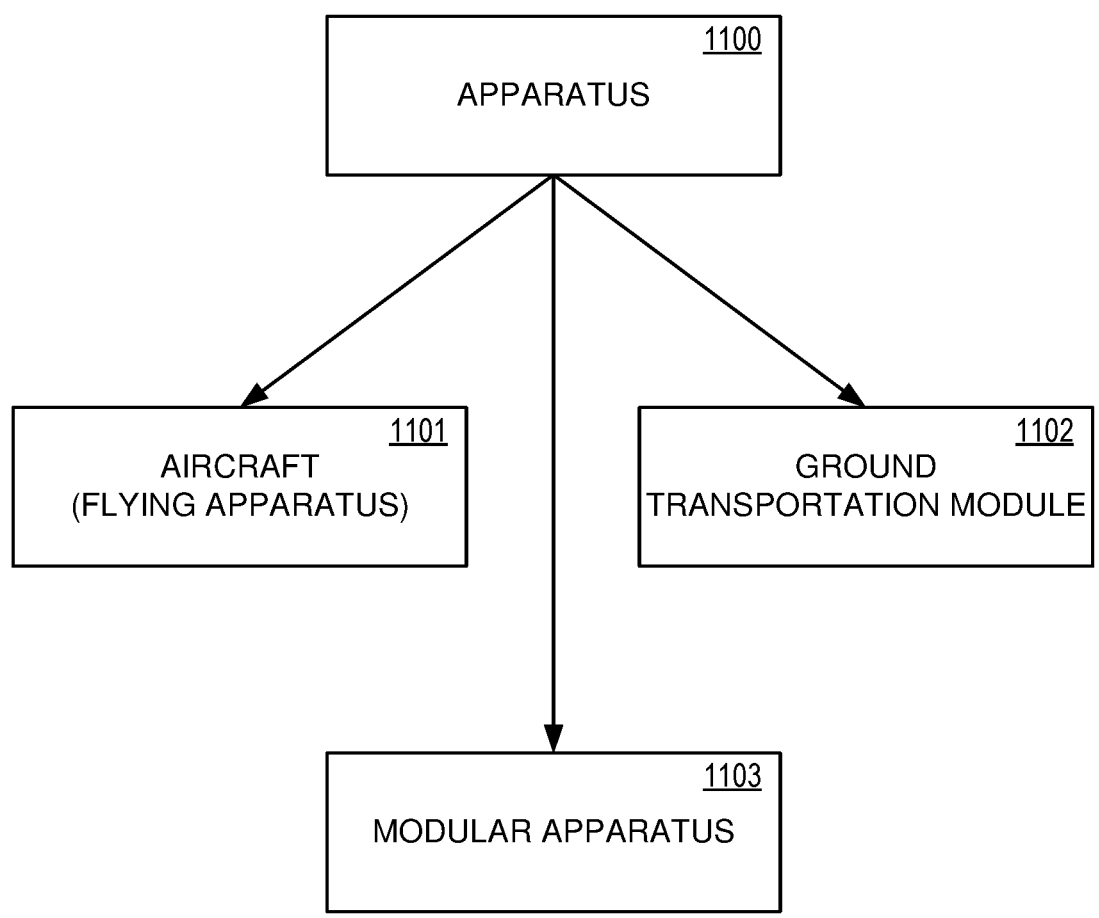
FIG. 11 is a block diagram of an apparatus 1100 for which configuration management for MBSE may be advantageously employed in accordance with an example.
Figure 12:
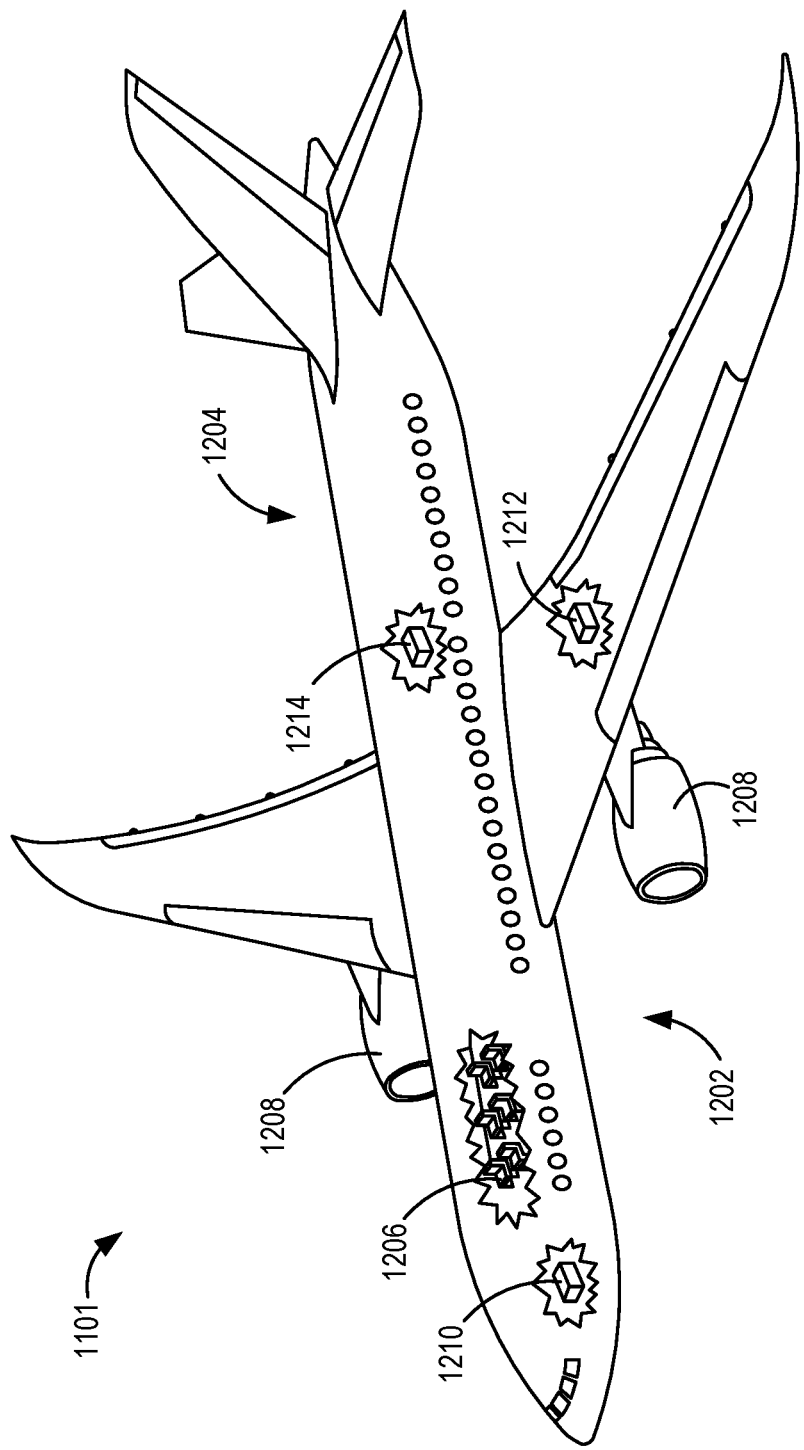
FIG. 12 is a schematic perspective view of a particular flying apparatus 1101 in accordance with an example.

Some examples of the disclosure are used in manufacturing and service applications as shown and described in relation to FIGS. 10-12. Thus, examples of the disclosure are described in the context of an apparatus of manufacturing and service method 1000 shown in FIG. 10 and apparatus 1100 shown in FIG. 11. In FIG. 11, a diagram illustrating an apparatus manufacturing and service method 1000 is depicted in accordance with an example. In one example, during pre-production, the apparatus manufacturing and service method 1000 includes specification and design 1002 of the apparatus 1100 in FIG. 11 and material procurement 1104. During production, component, and subassembly manufacturing 1006 and system integration 1008 of the apparatus 1100 in FIG. 11 takes place. Thereafter, the apparatus 1100 in FIG. 11 goes through certification and delivery 1010 in order to be placed in service 1012. While in service by a customer, the apparatus 1100 in FIG. 11 is scheduled for routine maintenance and service 1014, which, in one example, includes modification, reconfiguration, refurbishment, and other maintenance or service subject to configuration management, described herein.

In one example, each of the processes of the apparatus manufacturing and service method 1000 are performed or carried out by a system integrator, a third party, and/or an operator. In these examples, the operator is a customer. For the purposes of this description, a system integrator includes any number of apparatus manufacturers and major-system subcontractors; a third party includes any number of vendors, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 11, the apparatus 1100 is provided. As shown in FIG. 11, an example of the apparatus 1100 is a flying apparatus 1101, such as an aerospace vehicle, aircraft, air cargo, flying car, and the like. As also shown in FIG. 11, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 11 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 12, a more specific diagram of the flying apparatus 1101 is depicted in which an implementation of the disclosure is advantageously employed. In this example, the flying apparatus 1101 is an aircraft produced by the apparatus manufacturing and service method 1000 in FIG. 10 and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example method of configuration management for MBSE comprises: partitioning a system project into a baseline portion and a working portion; generating, in the working portion, a change package; generating, for the change package, an impact analysis, wherein generating the impact analysis comprises: based at least on change information, determining directly impacted elements; and based at least on the directly impacted elements, determining indirectly impacted elements; importing, from a baseline model into the change package, the directly impacted elements and the indirectly impacted elements; modifying at least one imported directly impacted element to generate a modified element; and integrating the modified element into the baseline model.

An example system for configuration management for MBSE comprises: one or more processors; and a memory storing instructions that, when executed by the one or more processors, cause the one or more processors to perform operations comprising: partitioning a system project into a baseline portion and a working portion; generating, in the working portion, a change package; generating, for the change package, an impact analysis, wherein generating the impact analysis comprises: based at least on change information, determining directly impacted elements; and based at least on the directly impacted elements, determining indirectly impacted elements; importing, from a baseline model into the change package, the directly impacted elements and the indirectly impacted elements; modifying at least one imported directly impacted element to generate a modified element; and integrating the modified element into the baseline model.

An example computer program product comprises a computer usable medium having a computer readable program code embodied therein, the computer readable program code adapted to be executed to implement a method for configuration management for MBSE, the method comprising: partitioning a system project into a baseline portion and a working portion; generating, in the working portion, a change package; generating, for the change package, an impact analysis, wherein generating the impact analysis comprises: based at least on change information, determining directly impacted elements; and based at least on the directly impacted elements, determining indirectly impacted elements; importing, from a baseline model into the change package, the directly impacted elements and the indirectly impacted elements; modifying at least one imported directly impacted element to generate a modified element; and integrating the modified element into the baseline model.

Alternatively, or in addition to the other examples described herein, examples include any combination of the following:

nesting the change package into a second change package;
determining whether the change package is current;
based at least on the change package not being current, updating the change package;
recording the integration of the modified element in a revision history;
based at least on modifying the imported directly impacted element, updating the impact analysis;
creating a new element within the change package;
integrating the new element into the baseline model;
generating a relation map indicating relationships among the directly impacted elements and the indirectly impacted elements;
the baseline model has a restricted set of permissions relative to permissions in the change package and the working package;
the baseline model has a restricted set of permissions relative to permissions in the system project;
generating, in the system project, the change package comprises importing change information from a change database;
setting permissions for the change package and working package;
setting permissions for the working package;
importing from the baseline model into the change package comprises importing from the baseline model into a change space in the change package;
assigning unique identifiers to the directly impacted elements and the indirectly impacted elements;
fabricating a component of an apparatus in accordance with the new element or the modified element;
copying baseline model elements from the baseline model to the change package comprises copying a portion, less than all, of the baseline model elements from the baseline model;
the baseline model has a restricted set of permissions relative to permissions in the system project;
generating, in the system project, the change package comprises importing change information from a change database; and
generating a relation map indicating relationships among the directly impacted elements and the indirectly impacted elements.

When introducing elements of aspects of the disclosure or the examples thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of configuration management for model-based systems engineering (MBSE), the method comprising:
   partitioning a system project into a baseline portion and a working portion, the baseline portion comprising a baseline model;
   generating, in the working portion, a change package;
   generating, for the change package, an impact analysis, wherein generating the impact analysis comprises:
     based at least on change information, determining directly impacted elements; and
     based at least on the directly impacted elements, determining indirectly impacted elements;
   copying, from the baseline model of the baseline portion, the directly impacted elements and the indirectly impacted elements to the change package;
   modifying, in the change package, at least one directly impacted element copied from the baseline model to generate a modified element, the modifying updating relationship data between the at least one directly impacted element and the following: one or more different directly impacted elements copied to the change package; and one or more of the indirectly impacted elements copied to the change package;
   integrating the modified element into the baseline model; and
   based at least on the integrating, fabricating, by one or more processors executing instructions, a component of an apparatus associated with the system project in accordance with the modified element.

2. The method of claim 1,
   wherein updating the relationship data of the at least one directly impacted element updates references to other element counterparts in the working portion rather than in elements in the baseline model.

3. The method of claim 2, wherein the modifying further comprises maintaining links of the at least one directly impacted element to the elements in the baseline model.

4. The method of claim 1, wherein integrating the modified element into the baseline model comprises replacing the at least one directly impacted element in the baseline model with the modified element.

5. The method of claim 1, further comprising:
   based at least on modifying the directly impacted element copied from the baseline model, updating the impact analysis.

6. The method of claim 1, further comprising:
   creating a new element within the change package; and
   integrating the new element into the baseline model.

7. The method of claim 1, wherein integrating the modified element into the baseline model creates a new baseline model; and
   updating the system project with the new baseline model.

8. A system for configuration management for model-based systems engineering (MBSE), the system comprising:
   one or more processors; and
   a memory storing instructions that, when executed by the one or more processors, cause the one or more processors to perform operations comprising:
     partitioning a system project into a baseline portion and a working portion;
     generating, in the working portion, a change package;
     generating, for the change package, an impact analysis, wherein generating the impact analysis comprises:
       based at least on change information, determining directly impacted elements; and
       based at least on the directly impacted elements, determining indirectly impacted elements;
     copying, from a baseline model of the baseline portion into the change package, the directly impacted elements and the indirectly impacted elements;
     modifying, in the change package, at least one directly impacted element copied from the baseline model to generate a modified element based at least on a change to the baseline model;
     integrating the modified element into the baseline model; and
     based at least on the integrating, fabricating a component of an apparatus associated with the system project in accordance with the modified element.

9. The system of claim 8, wherein the operations further comprise:
   nesting the change package into a second change package.

10. The system of claim 8, wherein the operations further comprise:
    determining whether the change package is current; and
    based at least on the change package not being current, updating the change package.

11. The system of claim 8, wherein the operations further comprise:
    recording the integration of the modified element in a revision history.

12. The system of claim 8 wherein the operations further comprise:
    based at least on modifying the at least one directly impacted element copied from the baseline model, updating the impact analysis.

13. The system of claim 8, wherein the operations further comprise:
    creating a new element within the change package; and
    integrating the new element into the baseline model.

14. The system of claim 8, wherein the operations further comprise:
    generating a relation map indicating relationships among the directly impacted elements and the indirectly impacted elements.

15. A computer storage media having a computer readable program code embodied therein, the computer readable program code when executed by one or more processors, cause the one or more processors to implement a method for configuration management for model-based systems engineering (MBSE), the method comprising:

partitioning a system project into a baseline portion and a working portion, the baseline portion comprising a baseline model;

generating, in the working portion, a change package;

generating, for the change package, an impact analysis, wherein generating the impact analysis comprises:
based at least on change information, determining directly impacted elements; and
based at least on the directly impacted elements, determining indirectly impacted elements;

copying, from the baseline model into the change package, the directly impacted elements and the indirectly impacted elements;

modifying, in the change package, at least one directly impacted element copied from the baseline model to generate a modified element, the modifying updating relationship data between the at least one directly impacted element and the following: one or more different directly impacted elements copied to the change package; and one or more of the indirectly impacted elements copied to the change package;

integrating the modified element into the baseline model to resolve potential conflicts in an apparatus of an aircraft associated with the system project; and based at least on the integrating, fabricating a component of an apparatus associated with the system project in accordance with the modified element.

16. The computer storage media of claim 15, wherein the method further comprises:
nesting the change package into a second change package.

17. The computer storage media of claim 15, wherein the method further comprises:
determining whether the change package is current; and
based at least on the change package not being current, updating the change package.

18. The computer storage media of claim 15, wherein the method further comprises:
recording the integration of the modified element in a revision history.

19. The computer storage media of claim 15, wherein the method further comprises:
based at least on modifying the at least one directly impacted element copied from the baseline model, updating the impact analysis.

20. The computer storage media of claim 15, wherein the method further comprises:
creating a new element within the change package; and
integrating the new element into the baseline model.

* * * * *